B. T. McCANNA & F. C. HEINEN.
INTERNAL COMBUSTION ENGINE.
APPLICATION FILED APR. 8, 1912.

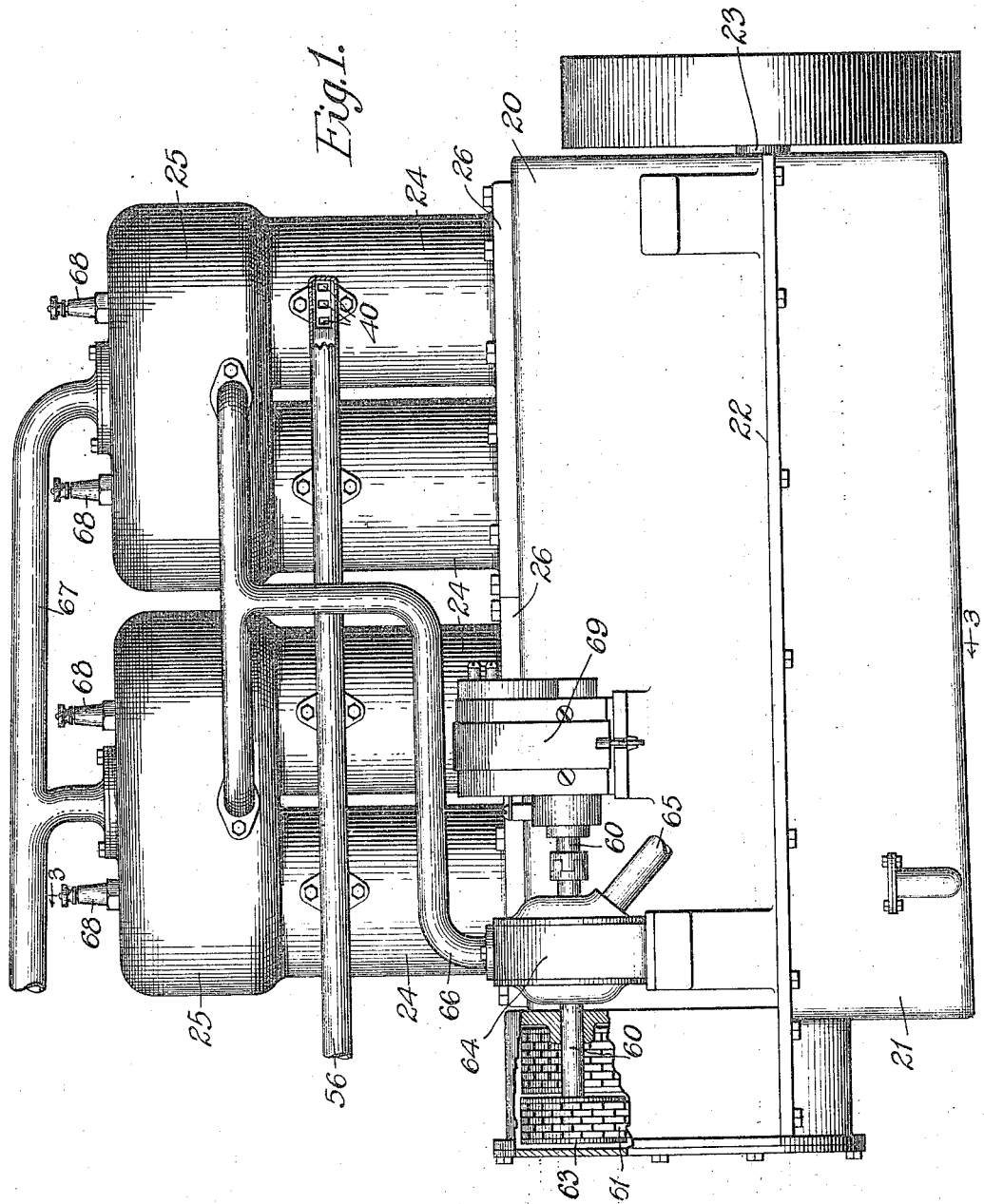

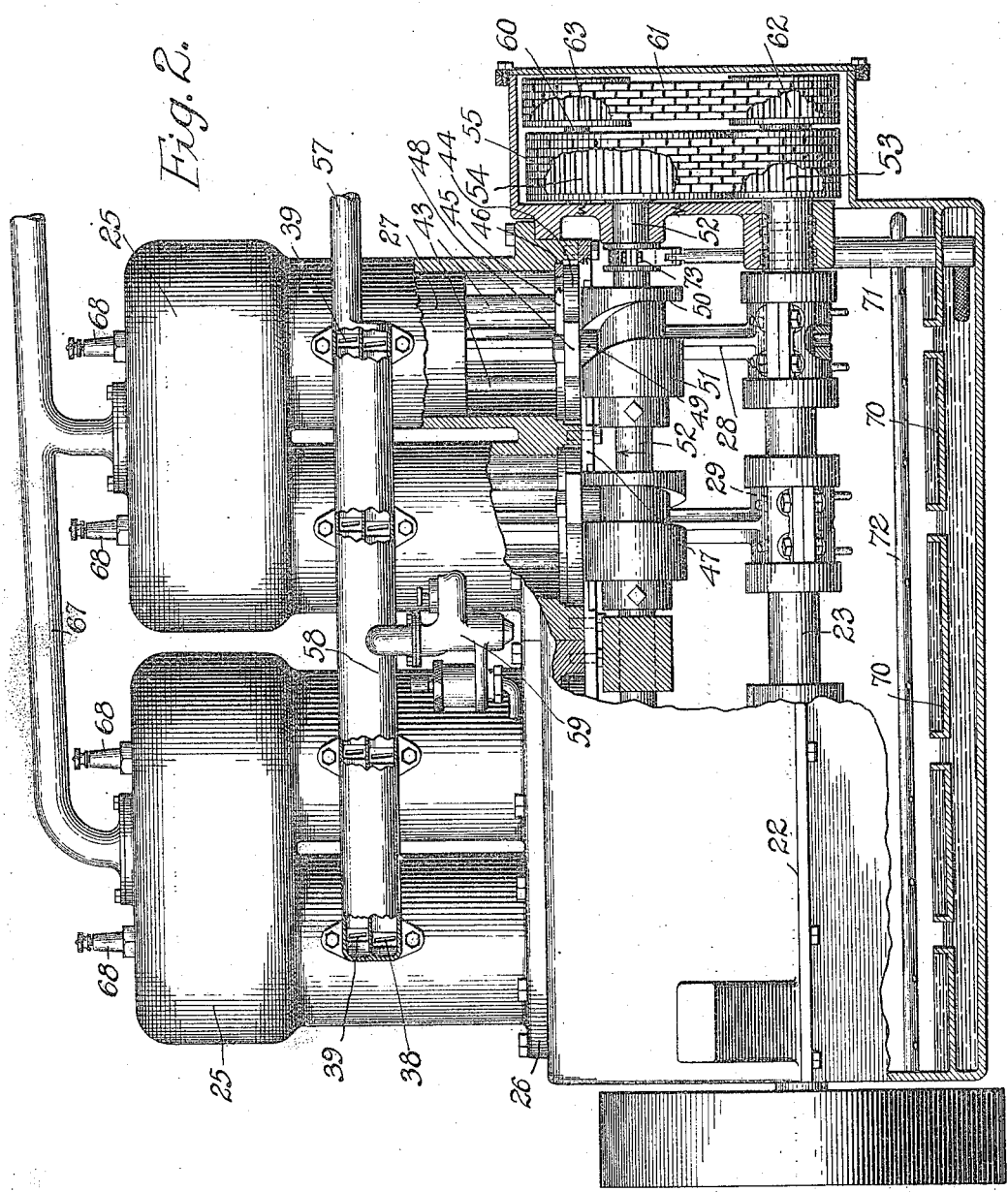

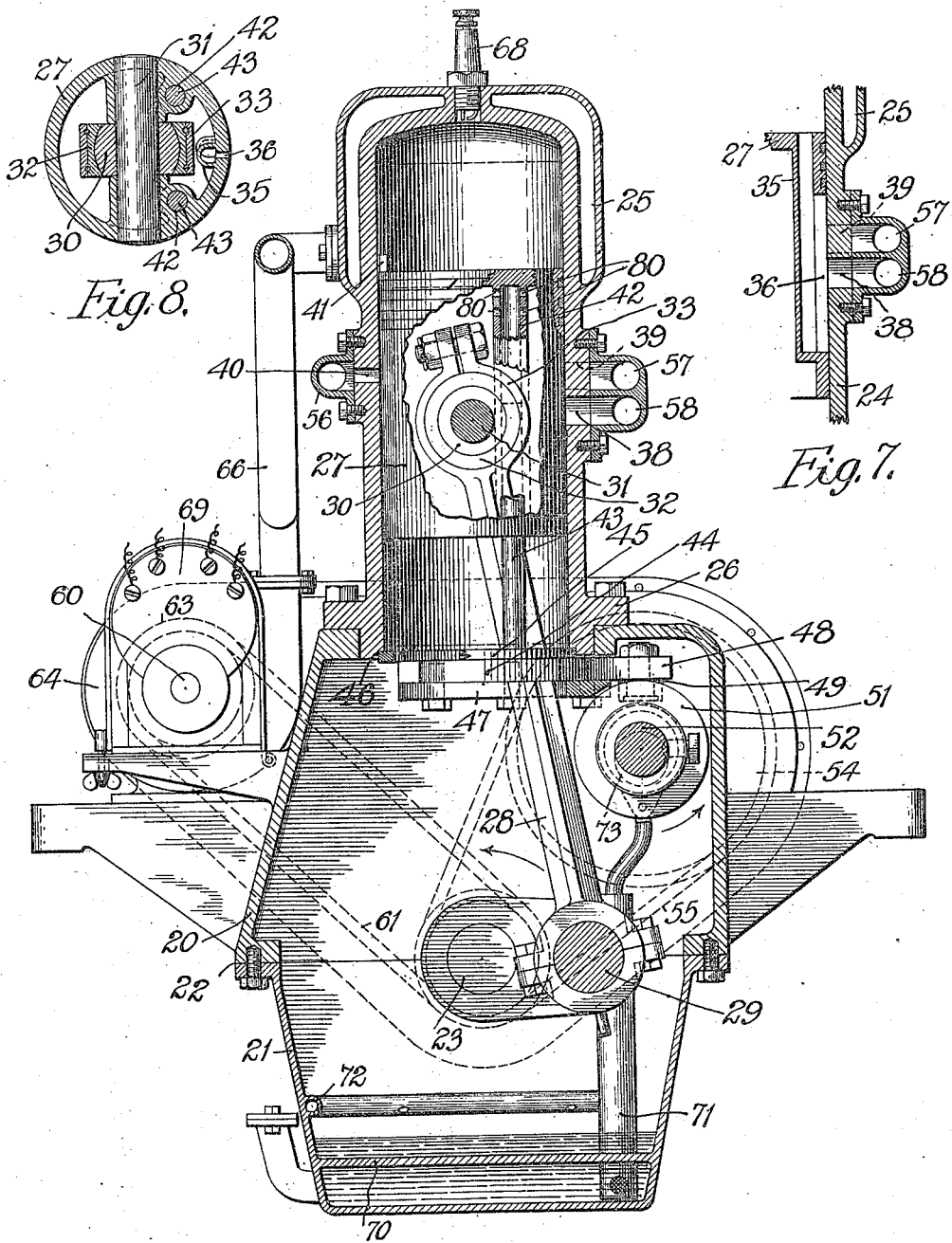

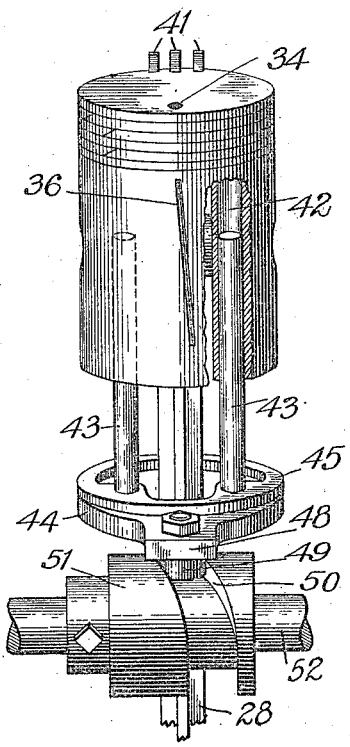
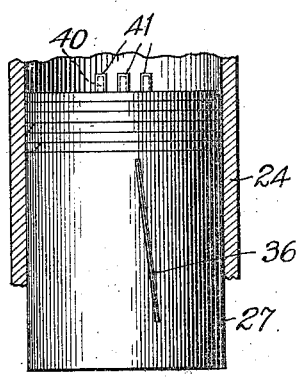
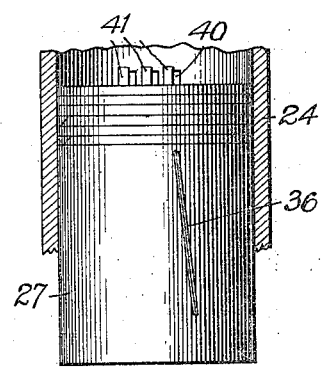

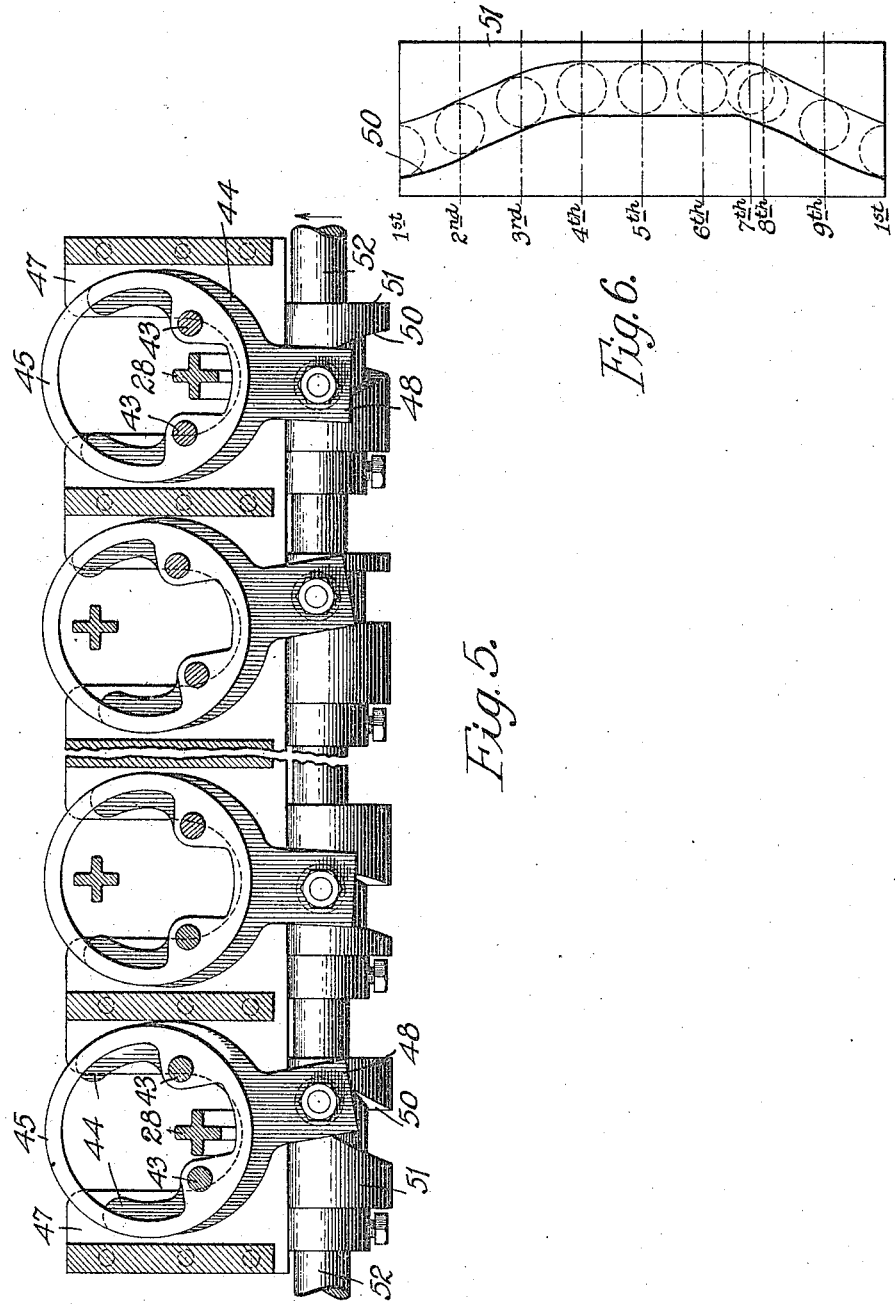

1,233,079.

Patented July 10, 1917.
6 SHEETS—SHEET 6.

Witnesses:
Leonard W. Novander
Robert F. Bracke

Inventors
Benjamin T. McCanna
Frank C. Heinen
By Brown & Williams
Attorneys

UNITED STATES PATENT OFFICE.

BENJAMIN T. McCANNA AND FRANK C. HEINEN, OF CHICAGO, ILLINOIS, ASSIGNORS OF ONE-HALF TO NATHAN F. LEOPOLD, OF CHICAGO, ILLINOIS.

INTERNAL-COMBUSTION ENGINE.

1,233,079.

Specification of Letters Patent.  Patented July 10, 1917.

Application filed April 8, 1912.  Serial No. 689,106.

*To all whom it may concern:*

Be it known that we, BENJAMIN T. McCANNA and FRANK C. HEINEN, citizens of the United States, and residents of Chicago, in the county of Cook and State of Illinois, have invented certain new and useful Improvements in Internal-Combustion Engines, of which the following is a full, clear, concise, and exact description, reference being had to the accompanying drawings, forming a part of this specification.

Our invention relates to internal combustion engines. We have come to think of an engine constructed in accordance with our invention as a valveless four-cycle engine. This does not mean that there is no means for controlling the admission and exhaust from the engine cylinders. It does mean, however, that our invention provides a means whereby all of the ordinary forms of puppet, piston, sleeve and rotary valves are entirely eliminated. While, in accordance with our invention, the opening of all of the ports for admission and exhaust is controlled by the working piston of the engine, the cycle of operations in the engine cylinder conforms with the usual practice in four-cycle engines;—there is a combustion stroke in one direction, followed by an exhaust in the reverse direction; this in turn is followed by an intake stroke in the forward direction, followed in turn by a compression stroke which completes the cycle.

The opening and closing of the ports necessary for this four-cycle operation is effected by giving to the piston, not only the ordinary movement of reciprocation, but in combination therewith a movement of rotation about its axis of generation.

As will be apparent from a consideration of the accompanying drawings, the engine of our invention avoids the application of the ordinary valve mechanism. It provides means for securing a closer approach to the ideal of four-cycle operation. It attains closely ideal conditions from a thermodynamic standpoint without resorting to valve mechanism or valve operating mechanism, which is subject to rapid wear. Notwithstanding these advantages, the engine of our invention can be constructed at less cost than engines heretofore developed.

The conservatism of the above statement will appear from a consideration of a preferred embodiment of our invention, as illustrated in the accompanying drawings, in which—

Figure 1 is a left-hand side elevation of an automobile engine constructed in accordance with our invention;

Fig. 2 is a right-hand side elevation with parts broken away to reveal the internal construction and operation;

Fig. 3 is a cross-sectional view taken on line 3—3 of Fig. 1 with parts broken away;

Fig. 4 is a perspective view of one of the pistons and its associated mechanism;

Fig. 5 is a plan view of the piston rotating mechanism in which certain parts are shown in cross-section;

Fig. 6 is a development of the piston rotating cam surface;

Fig. 7 is a detail of certain ports and passages in cross-section;

Fig. 8 is a cross-section of the piston taken through the center of the wrist pin;

Figure 9:
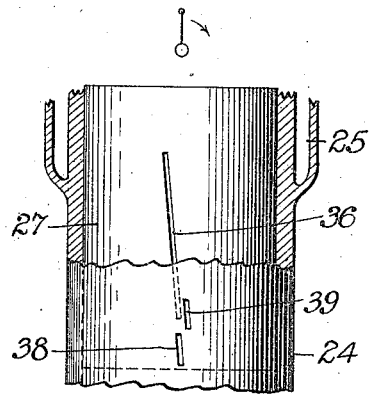

Figs. 9 to 16 inclusive show the piston at various points in the stroke of the engine, as indicated diagrammatically in connection with each such figure;

Fig. 17 illustrates the position of the piston at the end of the intake stroke; and Fig. 18 illustrates the position of the piston just prior to the completion of the firing stroke.

Like characters of reference are applied to corresponding parts in the several figures.

The crank case is formed of two parts 20 and 21 divided at 22 upon the plane of the axis of the crank shaft 23. The cylinders 24, 24 are cast in pairs with water jackets 25, 25 surrounding the cylinder heads as shown. The cylinders are provided with flanges 26, 26 by means of which the cylinders are bolted to the crank case. Each cylinder contains a working piston 27. Each piston is provided with a connecting rod 28, provided with a bearing at the lower end to engage a crank 29. The connection of the connecting rod with the piston is unusual. This detail is best illustrated in Fig. 8, which shows an alinement bearing which constitutes a universal joint of limited range. This joint is formed of a segment of a sphere 30 which fits tightly upon the pin 31. A split bearing 32 engages the ball and is in turn gripped by the clamping ring 33, into which the upper end of the connecting rod is formed. This special connection between the connecting rod and the piston is designed to permit the piston to receive a motion of rotation around its longitudinal axis in addition to the ordinary reciprocating motion of engine pistons.

Before proceeding to a description of the piston controlling mechanism, it may be well to explain generally that the passage of gases to and from the head of the piston is controlled wholly by the movement of the piston. Figs. 4 and 8 best illustrate the piston passageway which permits this mode of operation. A hole or channel 34 is cored or drilled from the head of the piston down through a rib or leg 35 which extends down the inside of the hollow piston. At 36, is milled a slot which connects with this piston passageway. The slot will ordinarily be cut on a line extending around the surface of the piston more or less closely in accord with the line of a helix of high pitch. It is through this piston slot and passageway that the intake of gas occurs as also the exhaust of part, at least, of the products of combustion.

The cylinder wall is provided with intake and exhaust ports with which this piston slot is brought into register at the proper periods in the cycle of the engine, the proper connection between the piston slot and the inlet and exhaust ports being effected by rotating the piston upon its longitudinal axis. Fig. 7 illustrates the piston slot 36 in register with the inlet port 38. Figs. 9 to 16 illustrate the position of the inlet port 38, as also the position of the auxiliary exhaust port 39. The main exhaust takes place through the main exhaust ports 40, the piston being provided with shutters 41, which close these main exhaust ports except at the end of the ignition stroke.

Having now indicated in a general way the means employed for controlling the admission and exhaust to and from the cylinder head, we shall describe the mechanism for imparting the necessary motion of rotation to the piston. Each piston is provided with one or more guide holes 42. A guide stud 43 projects into each such guide hole with a smooth running fit. We have illustrated two guides and guide studs, both of the studs being secured rigidly to the turning plate 44. A guide ring 45 fitting within a seat counterbored in the lower end of the cylinder at 46 maintains the alinement of the guide studs and guide plate 44. The guide plate is supported by the plate 47 which is bolted to the cylinder, as indicated. The guide plate 44 is provided with a projecting crank arm 48 in which or to which is attached the cam roller 49. The cam engages the sides of the slot 50 of the cam 51. The cam is mounted with similar cams for the other cylinders upon a cam shaft 52.

This cam shaft is carried in suitable bearings formed in the crank case and is driven from the crank shaft of the engine by means of the sprocket wheels 53 and 54 coöperating with the link belt 55. The cam shaft is driven at half-engine speed.

Assuming the engine to be in rotation, it will be apparent that the cam shaft operating through a cam and its associated guide plate and studs will give to each piston a motion of rotation in addition to its ordinary motion of reciprocation, the nature and amount of the rotational movement of each piston being dependent upon the layout of the working surfaces of the cam. Fig. 6 illustrates the developed surface of a cam designed to impart to the piston a motion which will bring the parts at different stages of the cycle into positions illustrated in Figs. 9 to 18 inclusive. Nine positions of the piston are indicated upon the development of the cam and similar positions of the piston are indicated in Figs. 9 to 16 inclusive. It will be apparent that the cam surfaces may be designed to control the degree of rotation of the piston and also to control the time at which the rotation of the piston occurs.

We believe that the mode of operation of the parts involved in rotating the piston will be made clear by a consideration of the motion imparted to the piston.

Figure 10:
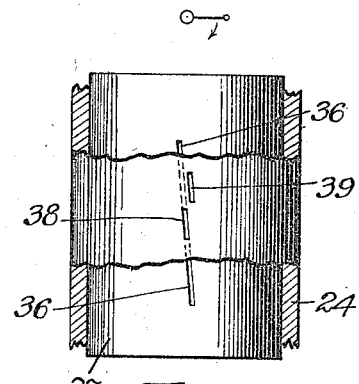
Figure 11:
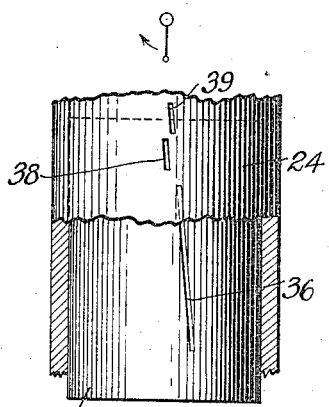
Figure 12:
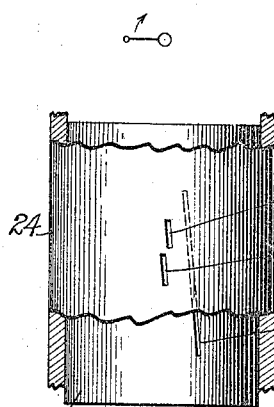
Figure 13:
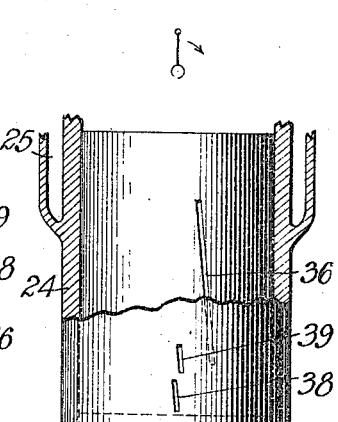
Figure 14:
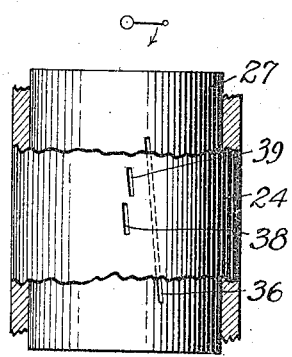
Figure 15:
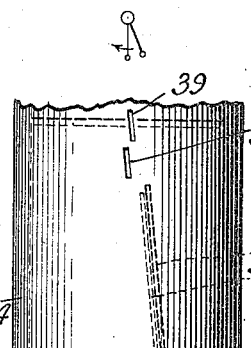

Fig. 9 shows the piston at the top of the cylinder, the engine being in motion as indicated by the crank diagram and arrow at the top of the figure. Fig. 10 shows the piston after the crank has moved through ninety degrees. It will be seen that as the piston descends the slot 36 is kept in register with the inlet port 38, due to a gradual motion of rotation which is imparted to the piston during its down stroke. Fig. 11 shows the piston at the bottom of its stroke and ready to ascend to effect the compression of the mixture drawn into the cylinder on the down stroke. It will be noted also that the piston has been rotated rather sharply to the right at the end of the down stroke. This rapid rotation of the piston continues until after the piston has begun the compression stroke. Fig. 12 shows the piston at about the middle of the compression stroke, where, as will be noted, the piston slot is no longer in register with the inlet port 38; nor, for that matter, in register with the auxiliary exhaust port 39. Fig. 13 shows the piston at the end of the compression stroke and ready for the firing of the cylinder charge. Fig. 14 shows the piston at the middle of the ignition stroke. In Fig. 15, the heavier dotted lines show the piston just prior to the end of the working stroke, while the lighter dotted lines indicate the condition at the end of the stroke. It will be noted that the piston has been rotated sharply to the left just at the end of the down stroke. It will be noted also that there has been no material rotation of the piston during the compression stroke or during the firing stroke which followed.

Fig. 18 may well be considered in conjunction with Fig. 15, since Fig. 18 shows the position of the main exhaust passages at the end of the ignition stroke. It will be noted that the shutters 41 are at this stage in an angular position such that the exhaust ports 40 are opened during the latter part of the ignition stroke. The crank angle at which the opening of the main exhaust ports occurs is determined by the location of the exhaust ports in the wall of the cylinder.

Figure 16:
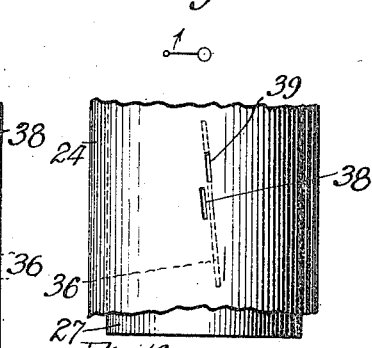

The piston having reached the end of the ignition stroke and the main exhaust ports having been opened to permit the expulsion of the major part of the gases of combustion, the piston proceeds upon its up or exhaust stroke as indicated in Fig. 16. While the main exhaust ports 40 are completely closed as soon as the head of the piston rises above the ports, the outlet to atmosphere is continued through the auxiliary exhaust port 39. The slot 36 is for this purpose rotated into a position such that it registers with the port 39. The register of the auxiliary exhaust port with the piston slot is maintained approximately until the end of the exhaust stroke, when the piston is rotated to the left to bring it again into the position indicated in Fig. 9.

Fig. 17 shows the position of the exhaust port shutters at the end of the intake stroke. It will be noted that the angular position of the pistons at this stage of the cycle is such as to maintain the closure of the main exhaust ports.

Having illustrated and described in this way the movement of the piston, it will not in our opinion be necessary to elaborate further upon the cam surfaces which impart the necessary motion of rotation to the piston. We believe it will be apparent to those skilled in the art that the cam surfaces may be designed to give the piston the rotary motion necessary to effect the opening and closing of the ports as herein described. It is, in our opinion, also a matter of design to vary the cam surfaces and rotating mechanism, in order to give the piston a rotational movement such as may be necessary to accommodate ports of sizes and dispositions other than those which we have used to illustrate our invention. It will be obvious also without elaboration on our part that the number of piston slots in each piston may be increased, if desired, it being necessary, of course, to provide the necessary ports for coöperation with each such added piston slot. An increase in the number of piston slots will reduce the amount of angular motion necessary to secure passages and openings of the size necessary to permit the rapid flow of gases. The same principle applies to the main exhaust port, where we have illustrated three port openings and three shutters. These give a cross-sectional area of the exhaust opening three times as large as could be secured if but a single port were employed. The number of exhaust ports and shutters is not limited to three, but may be increased as desired and in accordance with the nature of the work to be performed by the engine.

Most of the other features of the engine herein shown and described do not differ necessarily from standard practice already in vogue and well understood by those skilled in the art. For this reason a cursory description will suffice: At 56 we have shown the main exhaust manifold connected with the main exhaust ports 40 of the several cylinders. At 57, is illustrated the auxiliary exhaust manifold which in the drawings is formed integrally with the intake manifold 58. The exhaust manifold 57 connects with the auxiliary exhaust port 39 of the several cylinders, while the intake manifold 58 connects with the intake ports 38. A carbureter 59 is connected to supply a mixture of air and gas to the intake manifold in the usual manner.

The pump and magneto shaft 60 is driven from the crank shaft by the chain belt 61 and the sprocket wheels 62 and 63. The pump 64 is adapted to supply cooling water to the water jackets, the supply being drawn in through the pipe 65 and delivered to the water jackets through the pipe 66. The pipe 67 leads from the water jackets to the radiator ordinarily employed in automobile construction.

The spark plugs 68 are connected in the usual manner with the magneto 69, whereby properly timed ignition is effected in the several cylinders.

While lubrication can be effected in various ways, we have chosen to indicate a system in which the troughs 70 are provided in the crank case. The spoons on the connecting rods dip into these troughs in a manner well-known to those skilled in the art. An oil pump 71 pumps oil from the bottom of the crank case and delivers it through the pipe 72 to the several pans or troughs. The oil pump is operated by an eccentric 73 upon the cam shaft, as shown. The cylinder may be lubricated in any of the various ways known to the art. The cranks and connecting rods will throw a considerable amount of oil into the lower ends of the cylinders with the result that the guides and guide rods will act in a measure as pumps to pump oil up into the piston guide holes. Accordingly, we have drilled holes 80, which lead from the closed ends of the guide holes to the space in the interior of the piston. These holes serve two purposes, first, in preventing air cushions at the ends of the guide holes and, second, in permitting the expulsion of oil. These holes are so located as to pour oil out upon the upper ends of the connecting rods and the bearing surfaces appurtenant thereto.

It will serve no useful purpose for us to expatiate upon what we believe to be the advantages of the invention herein described; nor will it be necessary to attempt to describe, or even to mention, all possible modifications and variations. The spirit and scope of our invention is to be read in the following claims:

1. In an internal combustion engine, the combination of a cylinder, a piston adapted to reciprocate therein, a crank shaft, a crank, a connecting rod connecting the piston with the crank, a guide hole extending longitudinally within the piston, a guide stud slidably fitting the guide hole, a guide plate, a cam controlling the angular position of the guide plate, and means for communicating motion from the crank shaft to the cam.

2. In an internal combustion engine, the combination of a cylinder, a piston, a crank shaft, a crank, a connecting rod having universal connection with the piston and having connection also with the crank, a guide plate at the lower end of the cylinder, guide studs projecting from the guide plate and running in guide holes in the piston, a cam driven by the crank shaft, a lever extending from the guide plate and driven from the cam to change the angular position of the piston during its reciprocation.

3. In a device of the class described, the combination of an engine cylinder, a piston adapted to reciprocate therein, a piston slot through the side wall of the piston, the slot extending along and around the piston in a substantially helical line, a gas passage connecting the piston slot with the head of the piston, inlet and exhaust ports in the cylinder wall, piston guide mechanism, and a cam driven by the crank shaft for operating the guide mechanism to oscillate the piston to bring the piston slot alternately into register with the inlet and exhaust ports.

4. In an internal combustion engine the combination of a cylinder having intake and exhaust ports, a reciprocable and oscillatory piston in the cylinder, said piston constituting a valve to control the said intake and exhaust ports, and mechanism for oscillating the piston only during portions of the engine cycle other than the compression and power strokes to provide communications between the cylinder and the intake port on the intake stroke and between the cylinder and the exhaust port on the exhaust stroke and to prevent communication between the cylinder and either one or both of said ports during the compression and power strokes of the piston.

In witness whereof, we hereunto subscribe our names this 4th day of April, 1912.

BENJAMIN T. McCANNA.
FRANK C. HEINEN.

Witnesses:
LEONARD W. NOVANDER,
LEONARD E. BOGUE.

Copies of this patent may be obtained for five cents each, by addressing the "Commissioner of Patents, Washington, D. C."